UNITED STATES PATENT OFFICE.

ALLIOTT VERDON ROE, OF HAMBLE, SOUTHAMPTON, ENGLAND.

APPARATUS FOR TILTING PLANES ON AERIAL CRAFT.

1,336,160.      Specification of Letters Patent.      Patented Apr. 6, 1920.

Application filed May 12, 1917. Serial No. 168,227.

*To all whom it may concern:*

Be it known that I, ALLIOTT VERDON ROE, a subject of the King of Great Britain, residing at Hamble, Southampton, England, have invented certain new and useful Improvements in Apparatus for Tilting Planes on Aerial Craft, of which the following is a specification.

This invention relates to improvements in mechanism for tilting the tail or other planes of aerial craft by means of a threaded spindle engaging some part attached to the said plane or planes.

The object of the invention is to simplify the mechanism for tilting planes as mentioned.

According to this invention, a screw-threaded portion is constructed directly upon a bracing post, or strut, of the tail, or other plane which is to be tilted, the strut being braced to the plane, and preferably being inclosed within a hollow casing, which is attached to the fuselage; the bracing post is movable up and down within the hollow casing, and movement thereof also moves the plane, openings being formed at suitable places in the casing through which the bracing wires pass to the plane, and through which the connection of the plane itself to the bracing post is made. A nut is threaded upon the screw-threaded portion of the bracing post, and the nut is provided with a periphery suitable for a belt, a cable, a sprocket chain, or the like. The hollow casing is provided with an enlarged section, or box, and the nut is provided with recessed flanges at its ends which work against shoulders where the box joins the hollow casing, so that it is prevented from moving longitudinally while able to rotate freely.

Since the threaded portion of the bracing post passes through the nut, it will be seen that rotation of the latter causes the upward or downward movement of the bracing post, and consequently of the plane.

The hollow casing may be used as a stern post in which case it also carries lugs for the connection of the rudder plane, and suitable lugs or clips for its own attachment to the fuselage.

Preferably a sprocket nut will be employed, with a sprocket control wheel at the forward end, a composite cable and sprocket chain, guided so as to connect the two elements, being used, and forming a simple and convenient connection.

Instead of the ordinary bracing wires, an adjustable strut, or the like, may be made between the internal post and the tail plane in order to allow of movement of the latter about its pivots, which are forward of the stern post connection.

The accompanying drawings illustrate a preferred form of the invention as applied to the tail plane of an aeroplane.

Figure 1:
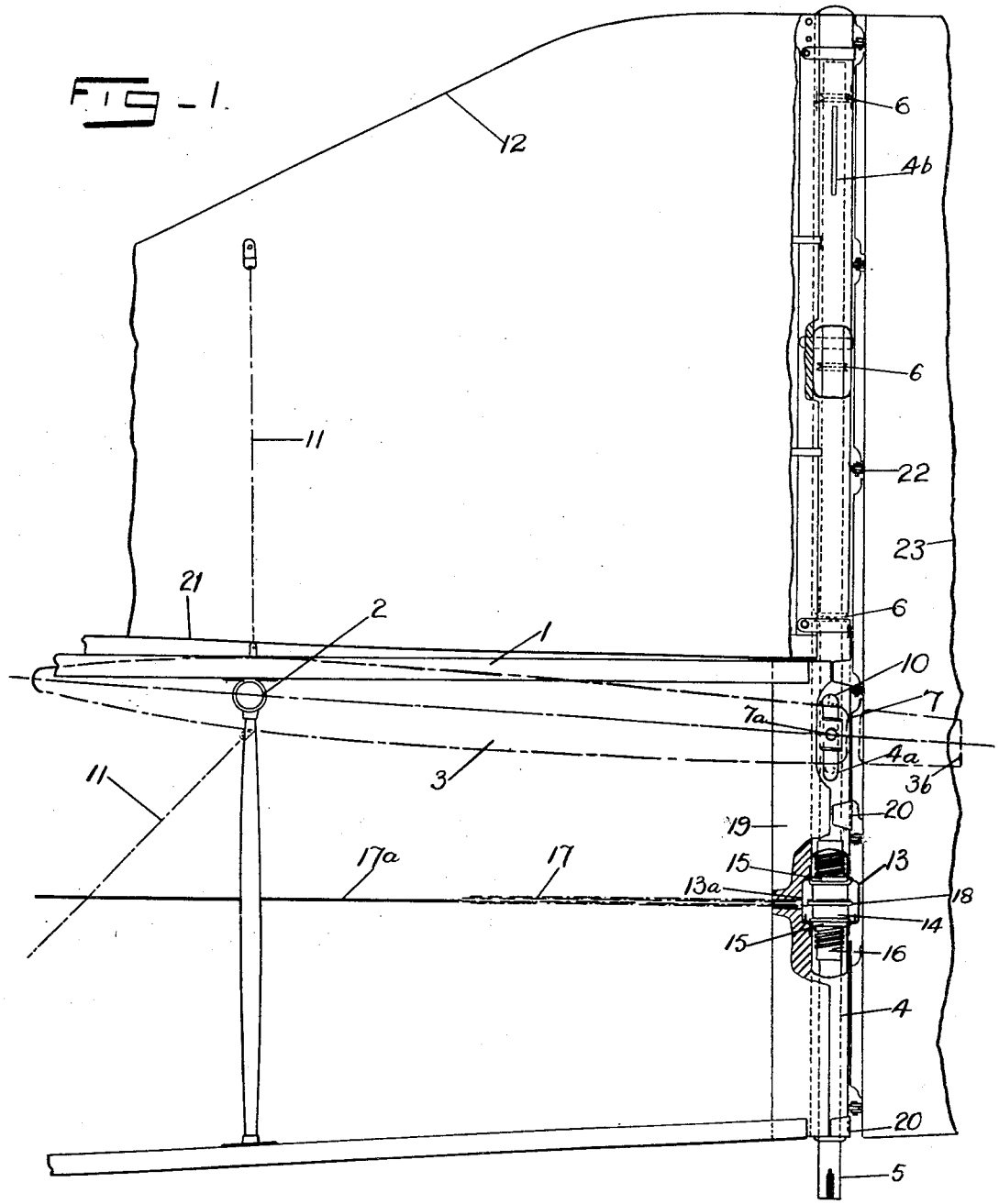
Figure 1 is a side elevation of the fuselage, tail plane and stern post partly in section.
Figure 2:
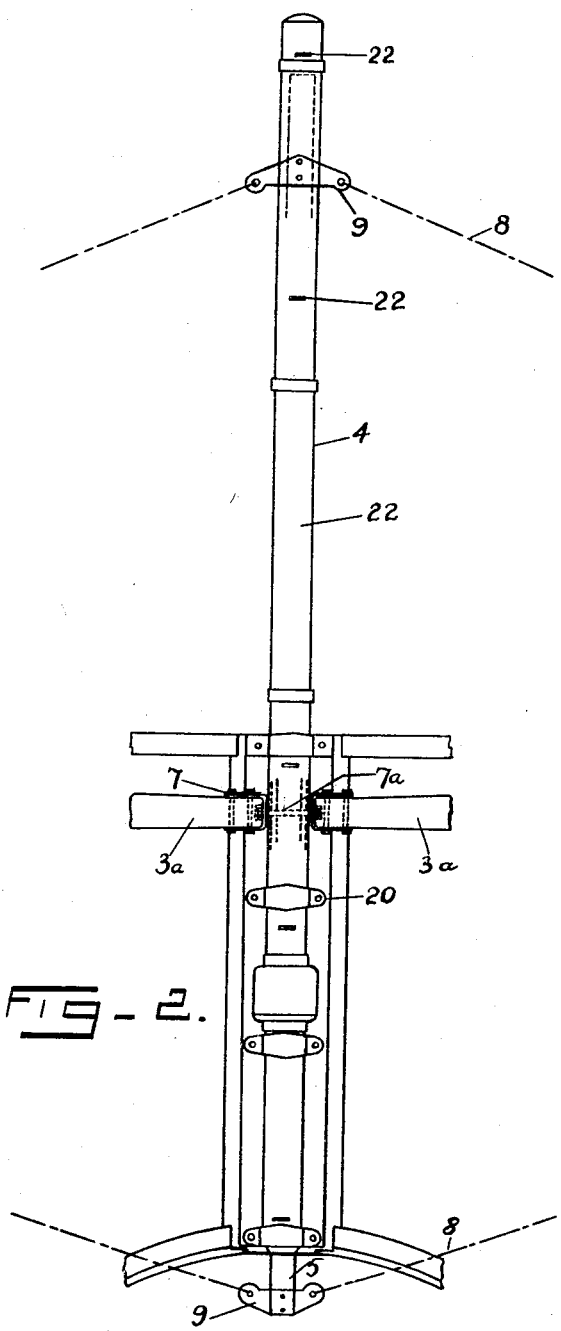
Fig. 2 is an end elevation of Fig. 1.
Figure 3:
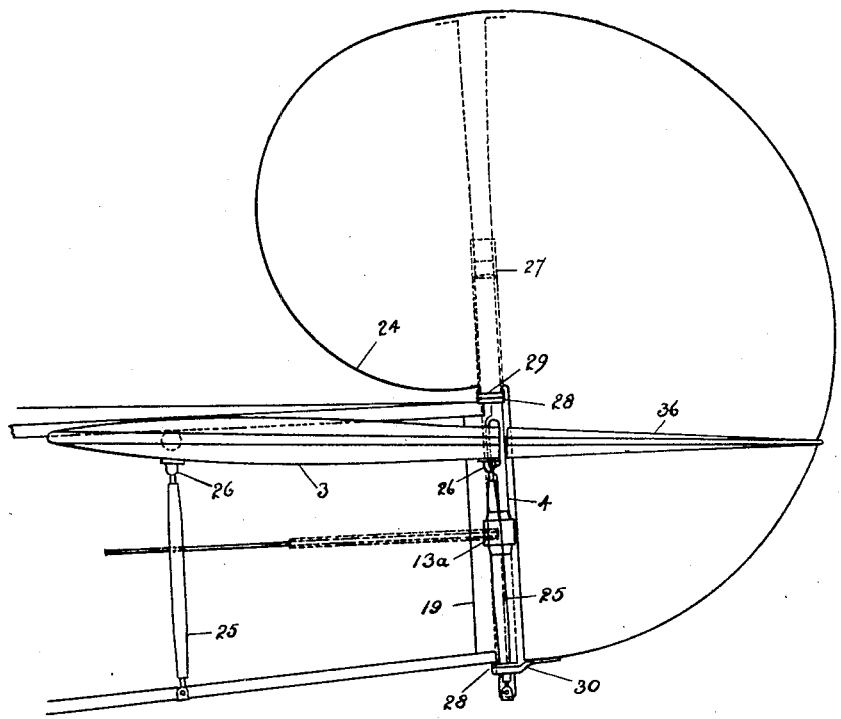
Fig. 3 is a diagrammatic view showing the arrangement when the strut is used as the tilting element.

Referring to Figs. 1 and 2, 3 indicates the tail planes of an aeroplane pivoted in the socket 2 on the longeron 1; $3^a$ is a rear spar of these planes to which are pivoted the elevators $3^b$. 4 is a tubular casing attached to the stern post 19 of the fuselage by means of the clips 20 and containing the bracing post or strut 5 movable longitudinally therein to which the tail planes 3 are attached. The bracing post 5 is guided by means of annular guide bushes 6, preferably of a V section as shown in Fig. 1, and the casing 4 is slotted at $4^a$ for the passage through its sides of the bolt $7^a$ forming a swivel connection between the bracing post 5 and the socket plates 7 of the rear spar $3^a$ of the plane 3; slight clearance is allowed in this connection to allow of the bolt $7^a$ moving in a circle about the pivot point 2.

In addition to the connection at $7^a$, bracing wires 8 connect the tail planes 3 with the strut 5 by means of the bracing lugs 9 attached to the strut and passing through slots $4^b$ in the casing at its upper end. Other supports for the tail planes 3 are bracing wires 11 anchored to the vertical fin 12 and to the fuselage respectively.

A screw-threaded member 16 is provided on the strut 5 where it passes through the nut 14, and this nut 14 is carried by its recessed ends 15 working against the shoulders formed between the enlarged space of the box 13 and the casing 4. A sprocket wheel 18 is formed on the periphery of the nut 14 and a sprocket chain 17 thereon passes away through the openings 13ª of the box 13 and is connected with the forward end of the fuselage by cable extensions 17ª to suitable hand or foot operated gear, say to a hand wheel which can be operated conveniently by the aviator.

The vertical stabilizing fin 12 is clipped to the portion of the tubular casing 4 which extends above the deck 21 of the fuselage, while lugs 22 upon the rear edge of the casing provide means for the pivotal attachment of the rudder 23.

Referring to Fig. 3, which illustrates a tail plane supported by struts instead of bracing cables, 25, 25 are adjustable tubular struts which connect the tail plane forwardly of the fuselage framing by means of ball sockets 26 and rearwardly to the bottom of the strut 5 projecting from the tubular casing 4, the ball sockets serving to compensate for the radial movement of the planes about the pivotal connections at the base of the strut 5. The balance rudder 24 is employed in this case attached to and turning with the main rudder in order to reduce the force necessary to accomplish the turning of the main rudder. It has a tubular socket 27 which engages an upward extension of the tubular casing 4, the latter, of course, being much shorter in this case than in the case of the braced tail plane. Collars 28 located on the tubular casing above and below the fuselage body constitute thrust bearings for the rudder 24 which is provided with a fixed collar 29 at the lower extremity of the tubular socket 27 and a movable collar 30 at its lowermost end.

A great advantage of this invention is that the whole of the tilting mechanism and the hollow casing can be constructed as an entity apart from the framework of the machine, and can be attached to the said framework after manufacture, and further, the construction lends itself to cheap and easy repetition and is both neat and strong in practice.

What I claim as new and useful and of my own invention, and desire to secure by Letters Patent, is:—

1. In apparatus for tilting tail planes on aerial craft, a reciprocating bracing post stayed to said planes and guided within a casing disposed at the junctions of the upper and lower longerons at the rear of the fuselage, and providing a pivotal support for the rudder, means for reciprocating said bracing post comprising a threaded portion on said post and a nut fixed against axial displacement engaging said threaded portion, and operable rotatively by means connecting the said nut to control means adjacent the seat of the pilot.

2. In apparatus for tilting tail planes on aerial craft, a reciprocating bracing post stayed to said planes and guided within a casing disposed at the junctions of the upper and lower longerons at the rear of the fuselage, and providing a pivotal support for the rudder, means for reciprocating said bracing post comprising a threaded portion on said post and a box formed on said casing and between the upper and lower longerons, a nut engaging a screw threaded portion of said bracing post, and disposed against longitudinal displacement within said box, a sprocket wheel on the periphery of said nut, a chain engaging with said sprocket wheel, and means operable by the aviator for actuating the said chain so as to rotate the said sprocket wheel, and slots in the casing to permit the positioning of said chain.

3. In apparatus for tilting tail planes on aerial craft, a reciprocating bracing post stayed to said planes and guided within a casing disposed at the junctions of the upper and lower longerons at the rear of the fuselage, and providing a pivotal support for the rudder, means for reciprocating said bracing post comprising a threaded portion on said post and a nut fixed against axial displacement engaging said threaded portion, and operable rotatively by means connecting the said nut to control means adjacent the seat of the pilot, means for operatively connecting the inner rear portions of the said tail planes to the said bracing post, and a pivotal axis for said planes disposed in front of said bracing post and formed on the fuselage of the aerial craft.

4. In apparatus for tilting tail planes on aerial craft, a reciprocating bracing post stayed to said planes and guided within a casing disposed at the junctions of the upper and lower longerons at the rear of the fuselage, and providing a pivotal support for the rudder, means for reciprocating said bracing post comprising a threaded portion on said post and a nut fixed against axial displacement engaging said threaded portion, and operable rotatively by means connecting the said nut to control means adjacent the seat of the pilot, a swivel connection between the said reciprocating bracing post and planes, comprised by a transverse pin through said bracing post, and projecting through transverse slots in shackle members disposed on the adjacent edge of the tail planes, said transverse pin being retained in connection with the shackle members and vertical slots being provided in the casing of the said bracing post to permit movement of the transverse pin therewith.

5. An apparatus for tilting tail planes formed by a unit structure comprising a reciprocating bracing post contained and guided within a casing disposed at the rear of the machine, a pivotal support for the rudder, being formed on the said casing, a box formed on said casing, a nut engaging a screw threaded portion of said bracing post, and disposed against longitudinal displacement within said box, a sprocket wheel formed on said nut, and anchors protruding from said bracing post for staying said planes to said bracing post.

In testimony whereof I affix my signature.

ALLIOTT VERDON ROE.